US008359372B2

(12) United States Patent
Yalovsky

(10) Patent No.: US 8,359,372 B2
(45) Date of Patent: Jan. 22, 2013

(54) AUTOMATIC TRANSFER OF INFORMATION THROUGH PHYSICAL DOCKING OF DEVICES

(75) Inventor: Mark Yalovsky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 12/164,079

(22) Filed: Jun. 29, 2008

(65) Prior Publication Data
US 2009/0327560 A1 Dec. 31, 2009

(51) Int. Cl.
*G06F 15/177* (2006.01)
(52) U.S. Cl. .................. 709/220; 709/222; 710/303
(58) Field of Classification Search .................. 710/303, 710/304, 104; 726/6, 303; 709/220, 222, 709/228; 370/254
See application file for complete search history.

(56) References Cited

U.S. PATENT DOCUMENTS

| | | | |
|---|---|---|---|
| 6,892,230 B1* | 5/2005 | Gu et al. ...................... 709/220 |
| 7,200,357 B2* | 4/2007 | Janik et al. ................... 455/3.02 |
| 7,218,930 B2 | 5/2007 | Ko et al. |
| 7,321,784 B2* | 1/2008 | Serceki et al. ............... 455/557 |
| 7,940,732 B2* | 5/2011 | Lowry et al. .................. 370/338 |
| 7,958,211 B2* | 6/2011 | Lam et al. .................... 709/222 |
| 7,987,294 B2* | 7/2011 | Bryce et al. .................. 709/248 |
| 2003/0171135 A1* | 9/2003 | Brune et al. ................. 455/550.1 |
| 2004/0116109 A1* | 6/2004 | Gibbs et al. .................. 455/419 |
| 2004/0254661 A1 | 12/2004 | Ng et al. |
| 2005/0005115 A1* | 1/2005 | Hull ............................. 713/168 |
| 2005/0135628 A1 | 6/2005 | DaCosta |
| 2005/0198221 A1* | 9/2005 | Manchester et al. .......... 709/220 |
| 2005/0257055 A1 | 11/2005 | Anderson |
| 2006/0098666 A1* | 5/2006 | Francis Conde Powell .. 370/401 |
| 2007/0101039 A1 | 5/2007 | Rutledge et al. |
| 2007/0178830 A1* | 8/2007 | Janik et al. ................... 455/3.06 |
| 2007/0198632 A1 | 8/2007 | Peart et al. |
| 2007/0250917 A1* | 10/2007 | Bruchertseifer et al. ......... 726/5 |
| 2007/0275701 A1 | 11/2007 | Jonker |
| 2007/0291709 A1 | 12/2007 | Wassingbo et al. |
| 2008/0026794 A1 | 1/2008 | Warren |
| 2008/0075295 A1* | 3/2008 | Mayman et al. ................. 381/79 |
| 2008/0109529 A1* | 5/2008 | Story ............................ 709/217 |
| 2008/0242222 A1* | 10/2008 | Bryce et al. .................. 455/3.06 |
| 2009/0058707 A1* | 3/2009 | Craze et al. ................... 341/176 |
| 2009/0103547 A1* | 4/2009 | Lam et al. ................. 370/395.53 |

FOREIGN PATENT DOCUMENTS
EP 1553729 7/2005

OTHER PUBLICATIONS

International Search Report in corresponding PCT Application PCT/US2009/048918 dated Feb. 24, 2010, 3 pages.
"Wireless Sync" Oct. 3, 2007 http://zuneinsider.com/archive/2007/10/03/wireless-sync.aspx.

(Continued)

*Primary Examiner* — Abdullahi Salad
*Assistant Examiner* — Jimmy H Tran

(57) ABSTRACT

A personal media player is arranged to capture information, such as wireless network information (including network ID and key) and other kinds of information such as credentials (e.g., user name and password), and then share the information with a wireless networkable device when the player is physically coupled to the device in a docking process. When the personal media player is docked, the information is automatically transferred from the player to the device to enable the device to perform some action without any additional effort by the user. This could include, for example, discovering and be securely admitted to the wireless network, or accessing a remote service using the transferred credentials.

18 Claims, 9 Drawing Sheets

OTHER PUBLICATIONS

"New Zune: Wireless Only when Plugged in?" (Retrieved Apr. 16, 2008) http://weblogs.redeyechicago.com/iphoneblog/2007/10/something-good-.html.

"The Top-10 Benefits of USB Device Connectivity" Aug. 2005. http://www.hometoys.com/htinews/aug05/articles/silex/usb.htm.

"Out of the Box (& Into Every Room)", Mar. 1, 2004 http://www.firstglimpsemag.com/Editorial/article.asp?article=articles/2004/e0203/12e03/12e03.asp&guid=.

European Supplementary Search Report for European Patent Application No. 09800763.6, mailed Sep. 10, 2012, 7 pages.

* cited by examiner

AUTOMATIC TRANSFER OF INFORMATION THROUGH PHYSICAL DOCKING OF DEVICES

BACKGROUND

Wireless local area networks ("LANs") use RF (radio frequency) signals to link two or more personal computers ("PCs") or other devices without using wires. Particularly for home users, wireless networking has become very popular due to straightforward infrastructure installation, low cost, and the ease at which new devices may be added to the network. Most wireless networks will utilize one or more access points to match the footprint of wireless coverage to a desired area in the home. Sometimes an access point may be combined with a switch or gateway to enable PCs and devices on the wireless home network to connect to an external network such as the Internet.

Wireless RF signals are typically relatively high powered to accommodate variations in antenna designs in the transceivers that are incorporated into networked devices. While such high power generally supports good network performance, it can allow wireless data packets to be unintendedly intercepted by devices outside the network footprint. To deal with this situation, wireless network users will typically utilize one of a variety of encryption technologies that are commonly available such as WPA (Wi-Fi Protected Access) or WEP (Wired Equivalency Privacy).

Utilization of these technologies can make it difficult for the intercepted data to be decrypted and read. However, for such technologies to work each of the wireless devices on the network must have access to commonly-utilized network information. The information may include, for example, a network identification ("ID") and a network "key" (i.e., secret information). A device will use the network information to discover and then be admitted to the network that it is looking to join.

While wireless networks generally perform satisfactorily, it is often inconvenient for users to populate the commonly-utilized network information across all of the devices that the user wishes to have on a given network. In particular, the network key, such as a WEP key, can comprise a long string of alphanumeric characters that must be identically and accurately entered into each device. While some wireless networkable devices provide a graphical user interface ("GUI") or similar means to support manual entry of the required network information, such user interfaces will typically add cost and complexity to the device. In addition, data entry errors can still easily be made which is often a source of frustration to users who are simply looking to add a device to the wireless network without having to put in a lot of effort. Accordingly, it would be desirable to improve the manner in which network information may be populated in wireless networkable devices.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A personal media player is arranged to capture information, such as wireless network information (including network ID and key) and other kinds of information such as credentials (e.g., user name and password), and then share the information with a wireless networkable device when the player is physically coupled to the device in a docking process. When the personal media player is docked, the information is automatically transferred from the player to the device to enable the device to perform some action without any additional effort by the user. This could include, for example, discovering and be securely admitted to the wireless network, or accessing a remote service using the transferred credentials.

In various illustrative examples, the wireless networkable device is configured as a speaker that includes an integrated docking cradle that is configured to be removably interfaced with the personal media player. The player is docked in the cradle and the user is prompted through the graphical user interface ("GUI") to confirm that the user intends for the speaker to join the network. If so, the network information is automatically transferred so that the speaker can discover and securely join the wireless network without further interaction from the user. The user is then free to undock the player and then wirelessly play audio content from the player (or other wireless network device) from anywhere within the footprint of the wireless network over the speaker.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 2:
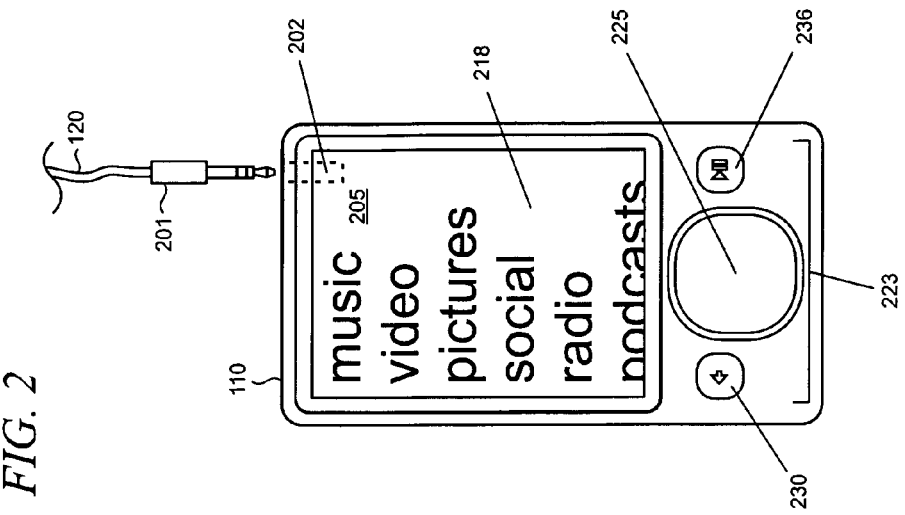
FIG. 2 shows a front view of an illustrative portable media player supporting a GUI on a display screen as well as user controls.
Figure 1:
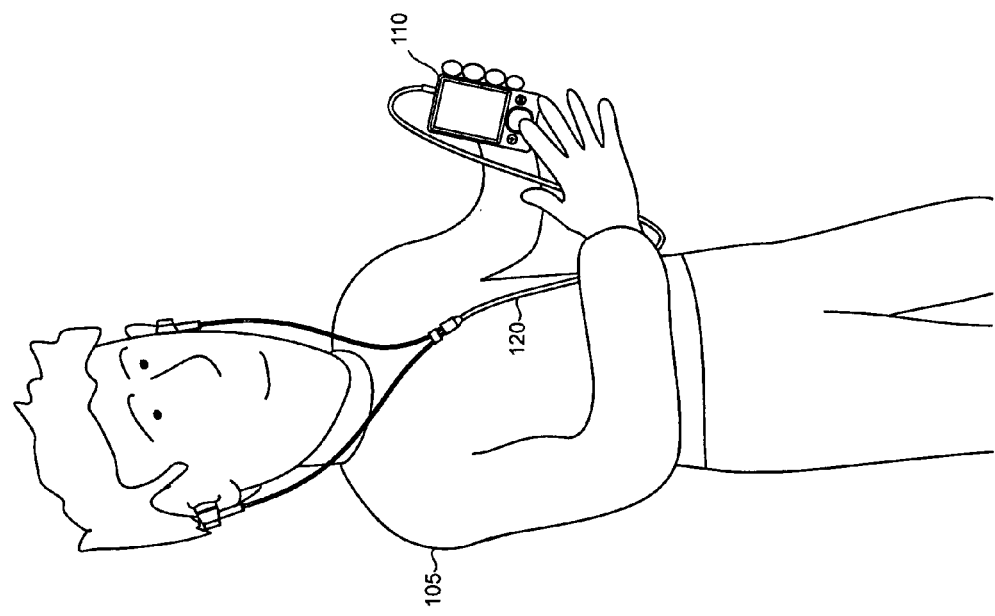
FIG. 1 shows an illustrative usage environment in which a user may listen to audio content and watch video content rendered by an illustrative personal media player.

FIG. 1 shows an illustrative portable device usage environment 100 in which a user 105 interacts with digital media content rendered by a personal media player 110. In this example, the personal media player 110 is configured with capabilities to play audio content such as MP3 files or content from over-the-air radio stations, display video and photographs, and render other content. The user 105 will typically use earphones 120 to enable audio content, such as music or the audio portion of video content, to be consumed privately (i.e., without the audio content being heard by others) and at volume levels that are satisfactory for the user while maintaining good battery life in the personal media player. Earphones 120 are representative of a class of devices used to render audio which may also be known as headphones, earbuds, headsets, and by other terms. Earphones 120 generally will be configured with a pair of audio speakers (one for each ear), or less commonly a single speaker, along with a means to place the speakers close to the user's ears. As shown in FIG. 2, the speakers are wired via cables to a plug 201. The plug 201 interfaces with an audio jack 202 in the personal media player 110.

FIG. 2 also shows a conventional GUI 205 that is rendered on a display screen 218, and user controls 223 that are built in to the personal media player 110. The GUI 205 uses menus, icons, and the like to enable the user 105 to find, select, and control playback of media content that is available to the player 110. In addition to supporting the GUI 205, the display screen 218 is also used to render video content, typically by turning the player 110 to a landscape orientation so that the long axis of the display screen 218 is parallel to the ground.

The user controls 223, in this example, include a gesture pad 225, called a G-Pad, which combines the functionality of a conventional directional pad (i.e., a "D-pad") with a touch sensitive surface as described in U.S. Patent Application Ser. No. 60/987,399, filed Nov. 12, 2007, entitled "User Interface with Physics Engine for Natural Gestural Control," owned by the assignee of the present application and hereby incorporated by reference in its entirety having the same effect as if set forth in length. A "back" button 230 and a "play/pause" button 236 are also provided. However, other types of user controls may also be used depending on the requirements of a particular implementation.

Figure 3:
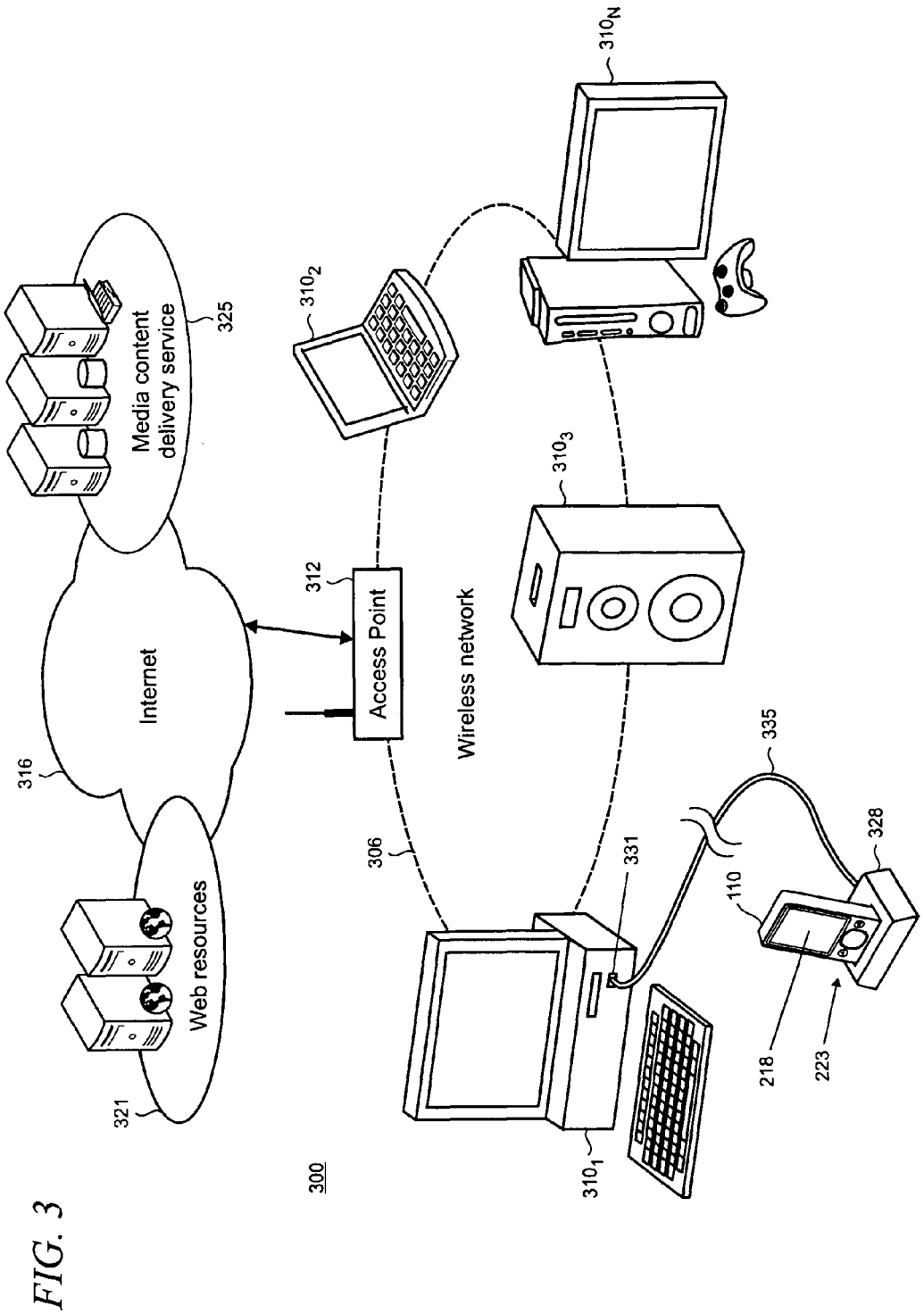
FIG. 3 shows an illustrative usage environment for a personal media player in which a wireless network includes a network access point that is used to support wireless communication among a number of devices.

FIG. 3 shows an illustrative usage environment 300 for the personal media player 110 in which a wireless network 306 includes a network access point that is used to support wireless communication among a number of devices $310_{1, 2 \ldots N}$ that are each configured for implementing communications over the wireless network. Various protocols may be utilized with the wireless network 306 including those complying with Wi-Fi (i.e., the Institute of Electrical and Electronics Engineers, IEEE 802.11 standards family).

Each device 310 will typically include a wireless transceiver plus the appropriate instructions (such as software code) needed to operate the transceiver. In this example, the devices include a PC $310_1$, a laptop computer $310_2$, a speaker dock $310_3$, and a game console $310_N$. However, it is emphasized that the devices 310 are intended to be illustrative and that other devices may be used within the environment 300 as needed to meet the needs of a particular implementation.

An access point 312 is utilized to provide the devices 310 with access to the wireless network 306. The access point 312 is also configured, in this example, with an integrated gateway functionality that enables connectivity to an external network such as the Internet 316. Such connectivity allows the devices 310 to access various resources which illustratively include Web resources 321 and a media content delivery service 325.

FIG. 3 also shows the personal media player 110 as typically inserted into a dock 328 for synchronization with the PC $310_1$. Dock 328 is coupled to an input port 331 on the PC $310_1$ such as USB port (Universal Serial Bus) with a synchronization ("sync") cable 335, in this example. A pair of mating connectors (including a dock connector in the player 110 and a device connector in the dock 328) are utilized to implement the connection between the personal media player 110 and the dock 328, where one of the connectors in the pair is disposed in the player and the other is disposed in the recess of the dock 328 in which the player sits. The dock 328 also typically provides a charging functionality to charge an onboard battery in the personal media player 110 when it is docked.

In alternative arrangements, the portable media player 110 may be coupled directly to the sync cable 335 without using the dock 328. The personal media player 110 is itself equipped with a Wi-Fi transceiver and may synchronize with the PC $310_1$ wirelessly as well as communicate with other devices 310 on the network 306.

The synchronization process implemented between the player 110 and the PC $310_1$ typically enables media content such as music, video, images, games, information, and other data to be downloaded from the media content delivery service 325 or other on-line source over the Internet 316 to the PC $310_1$. From the PC $310_1$, the downloaded media content may be transferred to the player 110. In this way, the PC $310_1$ operates as an intermediary or proxy device between the service 325 and the personal media player 110.

Figure 4:
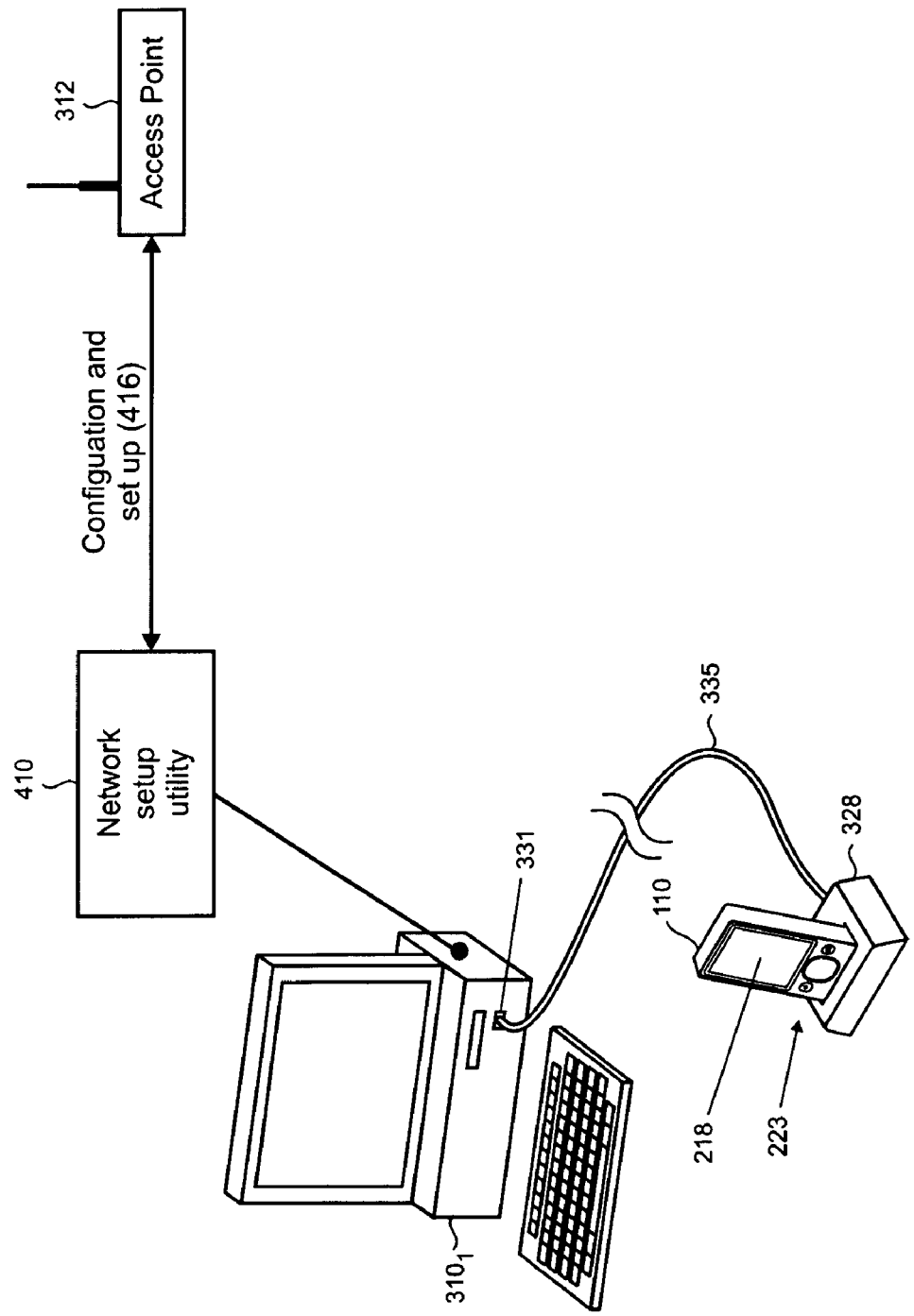
FIG. 4 shows several illustrative components that are used to implement the present automatic network information transfer.

In this example, a network setup utility 410 is instantiated on the PC $310_1$ as shown in FIG. 4. When run, the network setup utility 410 provides for configuration and setup of the access point 312, as indicated by reference numeral 416. The network setup utility 410 may be supported using HTML (Hypertext Markup Language) code that runs on a Web browser, for example. Alternatively, the network setup utility 410 may be configured as a standalone application. The network setup utility 410 will typically be arranged to specify a network ID and network key that will be utilized by the access point 312. In addition, various types of settings, preferences, and other configuration information may also be set using the utility 410.

The network setup utility 410 is further arranged to interact with the personal media player 110 to transfer the network information to the player for storage. The player 110 can then automatically transfer the stored network information to other devices that the user 105 intends to add on to the network. In alternative implementations, the utility 410 may be used to configure other types of information that can be transferred from the player 110 to the devices 310. For example, such information may include credentials such as user name and password used to access an on-line media content service. When later transferred to a device 310, for example, the on-line media content service can be contacted using the credentials to receive a stream of media content such as music or video which can then be rendered by the device.

Figure 5:
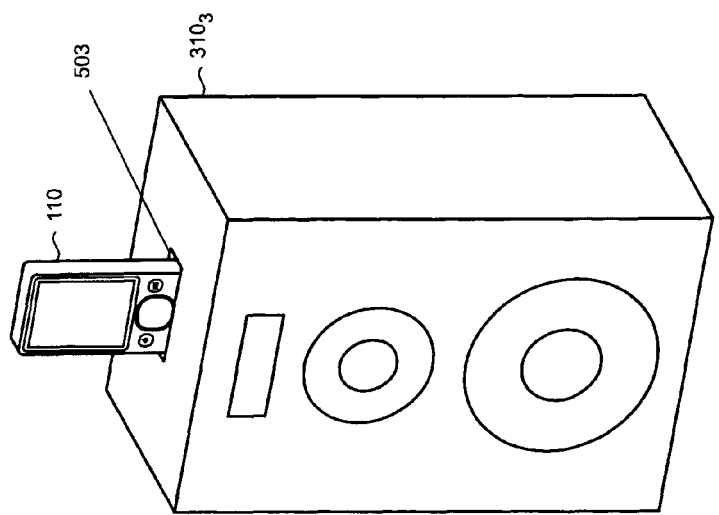
FIGS. 5 and 6 show a personal media player being docked with an accessory device to automatically transfer network information to the device.
Figure 6:
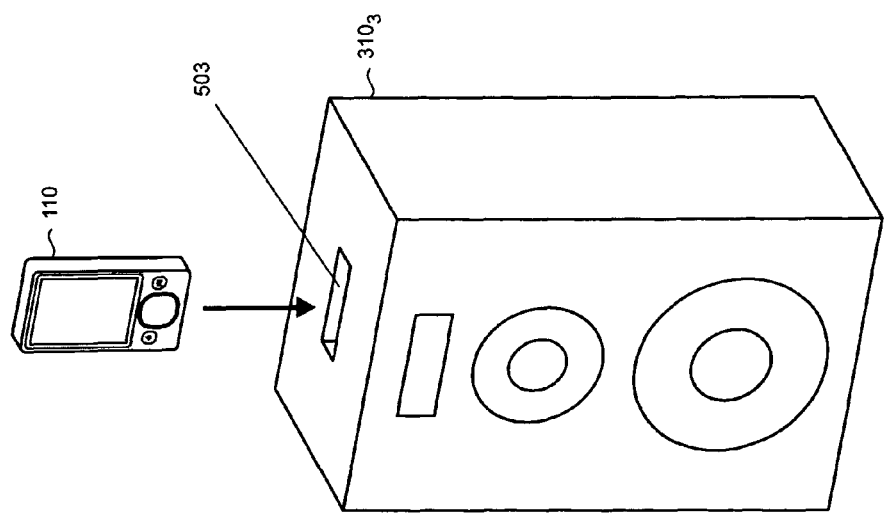

FIGS. 5 and 6 show one illustrative example of such automatic transfer of stored network information from the personal media player 110 to a device 310. In this example, the device is the speaker $310_3$ that includes an integrated docking cradle 503 that is specifically adapted to receive and interact with the player 110 to enable the speaker to later receive a stream of content from the media player that can be rendered. It is noted that the speaker $310_3$ is intended as an illustrative example only and that other types of devices may also be adapted to interface with the personal media player 110 in a similar manner. For example, the device 310 could also be an image rendering device and the stream of content from the player 110 could include video content, photographs, images, etc.

As shown in FIG. 6, the personal media player 110 interfaces with the integrated docking cradle 503 in a way that is similar to the conventional synchronization dock 328 shown in FIG. 3. Accordingly, the docking cradle 503 will include a device connector that is arranged to engage with a mating connector in the player 110. When the personal media player 110 is docked and the mating connectors are engaged, the network information stored on the player will automatically be transferred to the speaker $310_3$.

Figure 7:
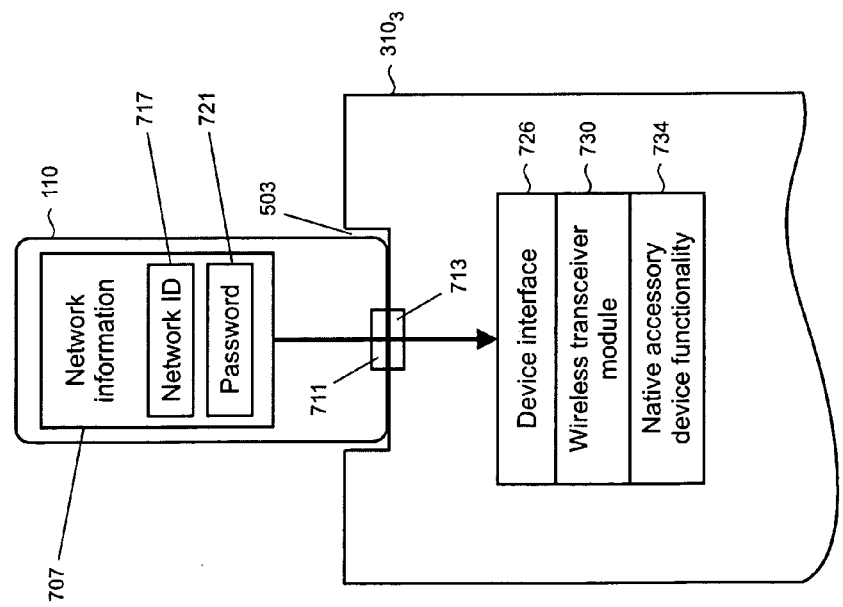
FIG. 7 shows details of functional components used to transfer network information to the accessory device.

FIG. 7 shows details of functional components used to transfer the stored network information 707 from the personal media player 110 to the speaker $310_3$. The stored network information 707 will typically be stored in a persistent form in nonvolatile memory of the player 110. When the docking connector 711 of the player 110 is operatively coupled to the device connector 713 in docking cradle 503, a signal through path is created to enable the stored network information 707, comprising a network ID 717 and network key 721 to be received by a device interface 726 in the speaker $310_3$.

Figure 8:
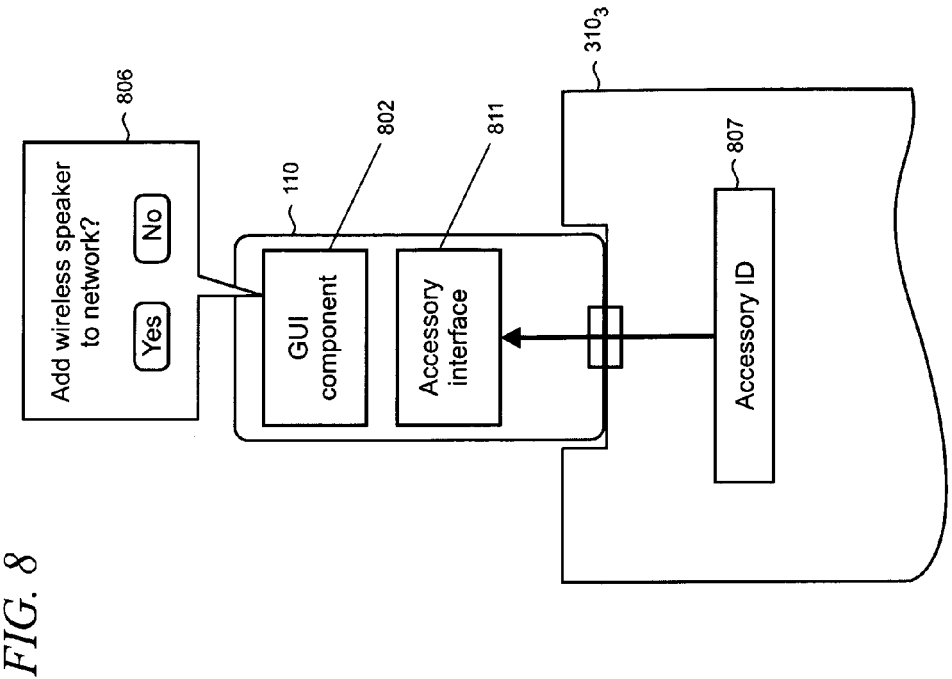
FIG. 8 shows details of the transfer of an accessory ID (identification) to the personal media player.

As shown in FIG. 8, the personal media player 110 is configured with a GUI component 802 that may be utilized to display a prompt 806 on the display screen of the player 110. The prompt 806, in this example, is used to confirm that the user intends to add the speaker $310_3$ to the wireless network 306 (FIG. 3).

Returning back to FIG. 7, the device interface 726 is operatively coupled to a wireless transceiver module 730 so that the received network ID 717 and network key 721 may be used by the speaker $310_3$ to identify the wireless network 306 (FIG. 3) and join on. The wireless transceiver module 730 is further operatively coupled to native accessory device functionality 734. In this example, the functionality 734 is associated with loudspeaker functionality and may typically include digital signal processing, amplification, and the like. For example, the wireless transceiver module 730 can receive a digital audio signal over the wireless network 306 that is then converted to an analog signal, amplified, and then rendered by one or more audio transducers in the speaker $310_3$. It is noted at this point that while a single speaker $310_3$ is shown, it may be used in a pair-wise arrangement, or include multiple sets of audio transducers in order to reproduce a multi-channel or stereo signal in some implementations.

Figure 9:
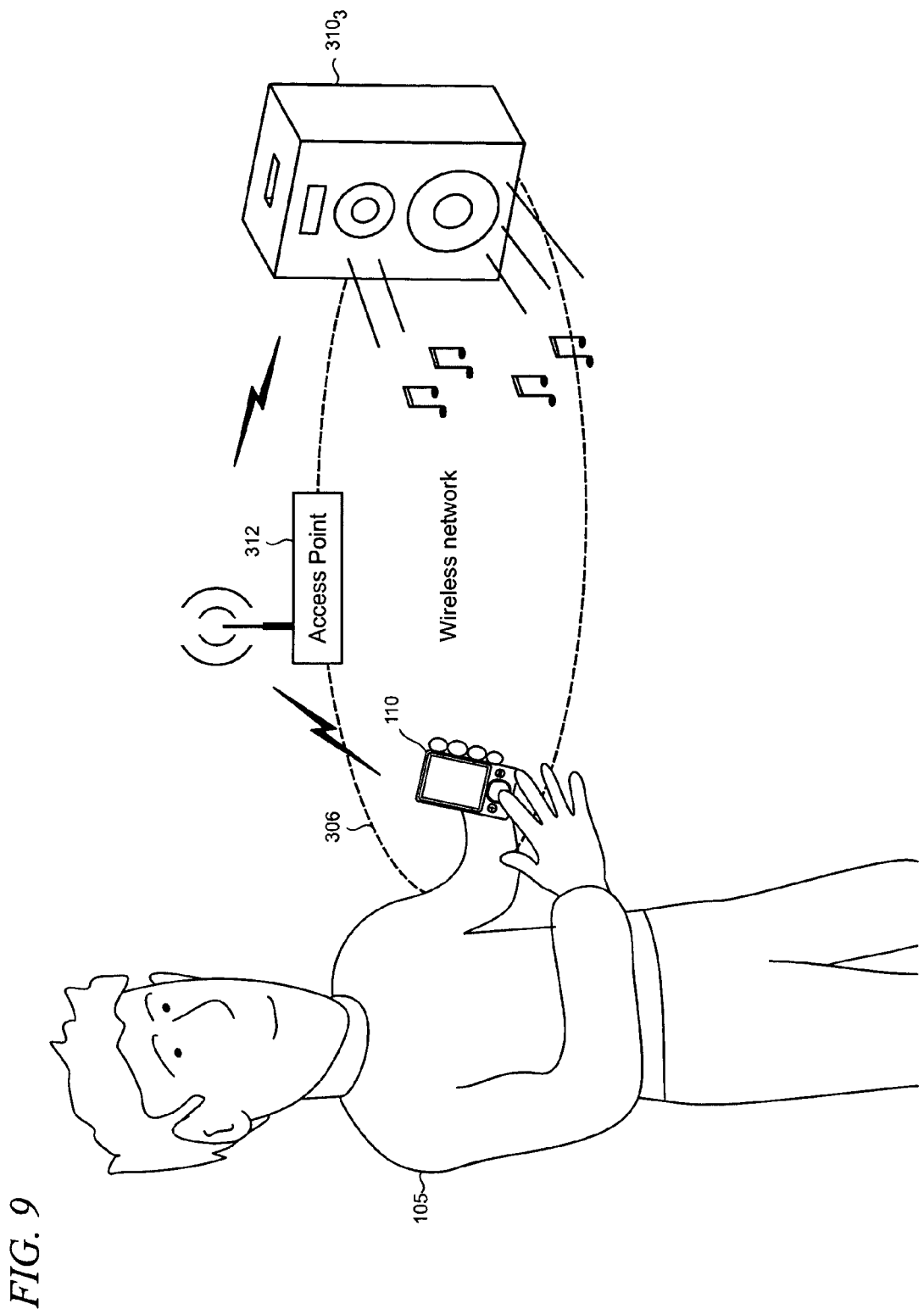
FIG. 9 shows the user playing audio content on an accessory device from a personal media player over a wireless network.

In this example, as shown in FIG. 8, the speaker $310_3$ is further arranged to transfer an accessory ID 807 that uniquely identifies the speaker to the personal media player 110 through an accessory interface 811. This transferred accessory ID 807 is arranged to enable the player 110 to discover the speaker $310_3$ on the wireless network 306 after the player is undocked from the speaker as shown in FIG. 9. In some implementations, the accessory ID 807 may be arranged as a globally unique identifier ("GUID").

FIG. 9 also shows how the user 105 can use speaker $310_3$ to render audio content that is stored on the personal media player 110. Here, the player 110 and speaker make a connection to the wireless network 306 through the access point 312. Music (or other audio content), video, images, etc., may then be streamed from the player 110 over the wireless network 306 and rendered by the speaker $310_3$ or other appropriately configured rendering device. In the case of music, such arrangement advantageously enables the user 105 to control playback of content through the speaker $310_3$ from a location that falls anywhere within the footprint of the wireless network 306. In addition, the user may wirelessly connect to other devices on the network in a similar manner.

Figure 10:
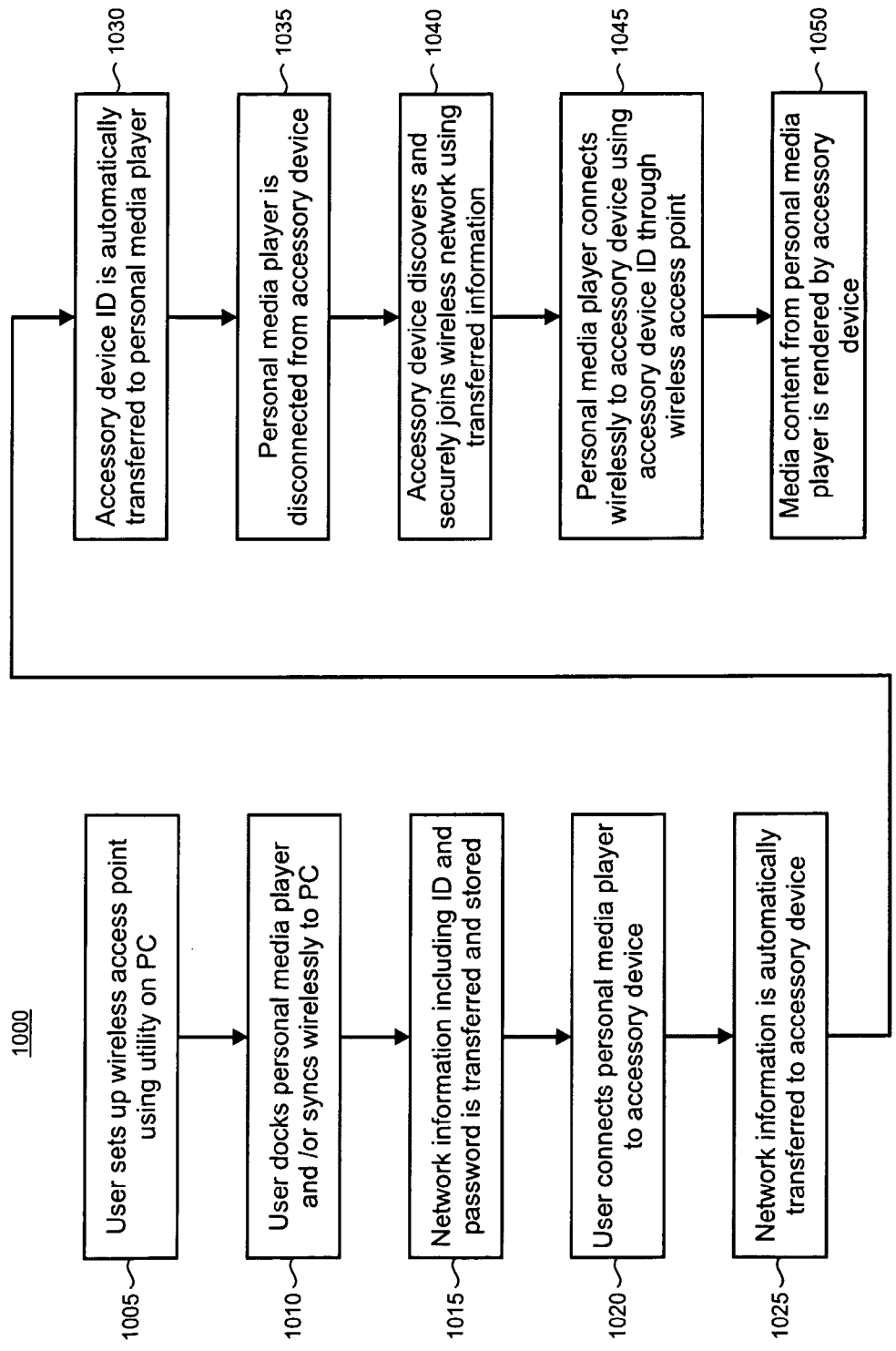
FIG. 10 is a flowchart of an illustrative method for automatically transferring network information between docked devices.

FIG. 10 is a flowchart of an illustrative method 1000 for automatically transferring network information between docked devices. The user 105 starts by using the wireless network setup utility 410 to configure the access point 312 with a user selected network ID and key (1005). The user 105 then docks the personal media player 110 to the PC $320_1$ or synchronizes wirelessly (1010) so that the network information including a network ID and key can be transferred to the player 110 and stored (1015).

The user 105 can then connect or dock the player 110 to an accessory device such as the speaker $310_3$ (1020). After docking, the network information is automatically transferred from the player 110 to the accessory device (1025), and an accessory device ID is transferred from the device to the player 110 (1030).

The user 105 can then undock or disconnect the personal media player 110 from the accessory device (1035). Using the transferred network information, the accessory device can discover the wireless network and join it in a secure manner (1040).

The player 110 can use the accessory device ID to locate and connect to the accessory device on the wireless network 306 through the access point (1045). Once connected, media content from the media player 110 can transmitted to the accessory device for remote rendering.

Figure 11:
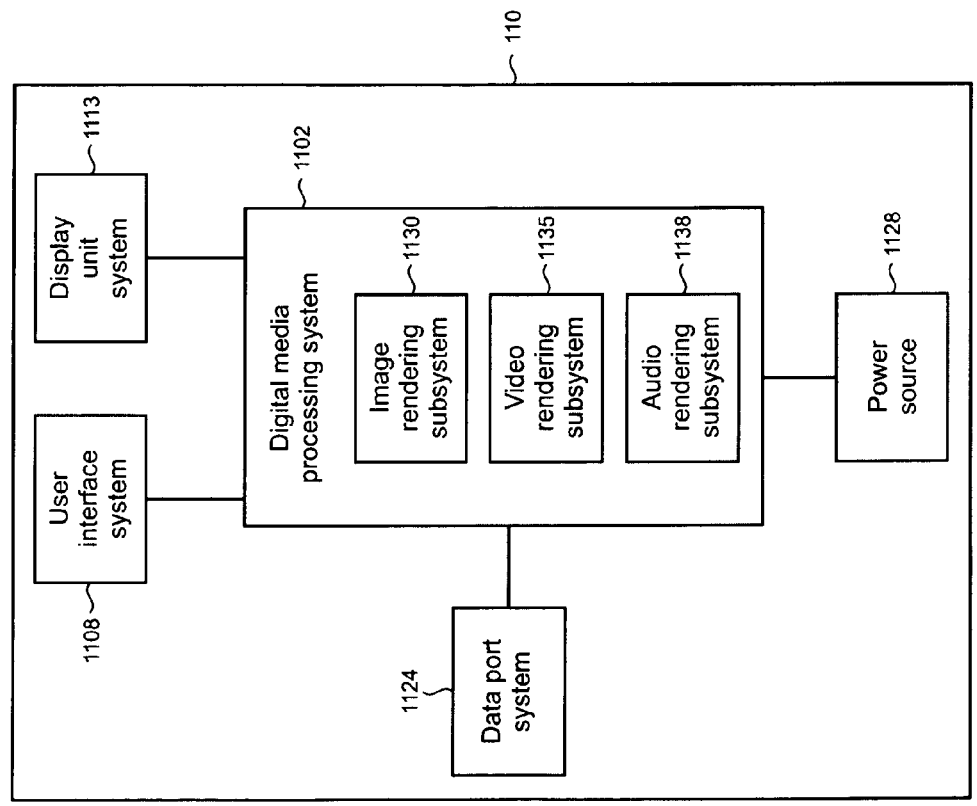
FIG. 11 is a simplified block diagram that shows various functional components of an illustrative example of a personal media player.

FIG. 11 a simplified block diagram that shows various illustrative functional components of the personal media player 110. The functional components include a digital media processing system 1102, a user interface system 1108, a display unit system 1113, a data port system 1124, and a power source system 1128. The digital media processing system 1102 further comprises an image rendering subsystem 1130, a video rendering subsystem 1135, and an audio rendering subsystem 1138.

The digital media processing system 1102 is the central processing system for the personal media player 110 and provides functionality that is similar to that provided by the processing systems found in a variety of electronic devices such as PCs, mobile phones, PDAs, handheld game devices, digital recording and playback systems, and the like.

Some of the primary functions of the digital media processing system 1102 may include receiving media content files downloaded to the player 110, coordinating storage of such media content files, recalling specific media content files on demand, and rendering the media content files into audio/visual output on the display for the user 105. Additional features of the digital media processing system 1102 may also include searching external resources for media content files, coordinating DRM (digital rights management) protocols for protected media content, and interfacing directly with other recording and playback systems.

As noted above the digital media processing system 1102 further comprises three subsystems: the video rendering subsystem 1135 which handles all functionality related to video-based media content files, which may include files in MPEG (Moving Picture Experts Group) and other formats; the audio rendering subsystem 1138 which handles all functionality related to audio-based media content including, for example music in the commonly-utilized MP3 format and other formats; and the image rendering subsystem 1130 which handles all functionality related to picture-based media content, including for example JPEG (Joint Photographic Experts Group), GIF (Graphic Interchange Format), and other formats. While each subsystem is shown as being logically separated, each may in fact share hardware and software components with each other and with the rest of the personal media player 110, as may be necessary to meet the requirements of a particular implementation.

Functionally coupled to the digital media processing system 1102 is the user interface system 1108 through which the user 105 may exercise control over the operation of the personal media player 110. A display unit system 1113 is also functionally coupled to the digital media processing system 1102 and may comprise the display screen 218 (FIG. 2). Audio output through the audio jack 202 (FIG. 2) for playback of rendered media content may also be supported by display unit system 1113. The display unit system 1113 may also functionally support and complement the operation of the user interface system 1108 by providing visual and/or audio output to the user 105 during operation of the player 110.

The data port system 1124 is also functionally coupled to the digital media processing system 1102 and provides a mechanism by which the personal media player 110 can interface with external systems in order to download media content. The data port system 1124 may comprise, for example, a data synchronization connector port, a network connection (which may be wired or wireless), or other means of connectivity.

The personal media player 110 has a power source system 1128 that provides power to the entire device. The power source system 1128 in this example is coupled directly to the digital media processing system 1102 and indirectly to the other systems and subsystems throughout the player. The power source system 1128 may also be directly coupled to any other system or subsystem of the personal media player 110. Typically, the power source may comprise a battery, a power converter/transformer, or any other conventional type of electricity-providing power source, personal or otherwise.

Figure 12:
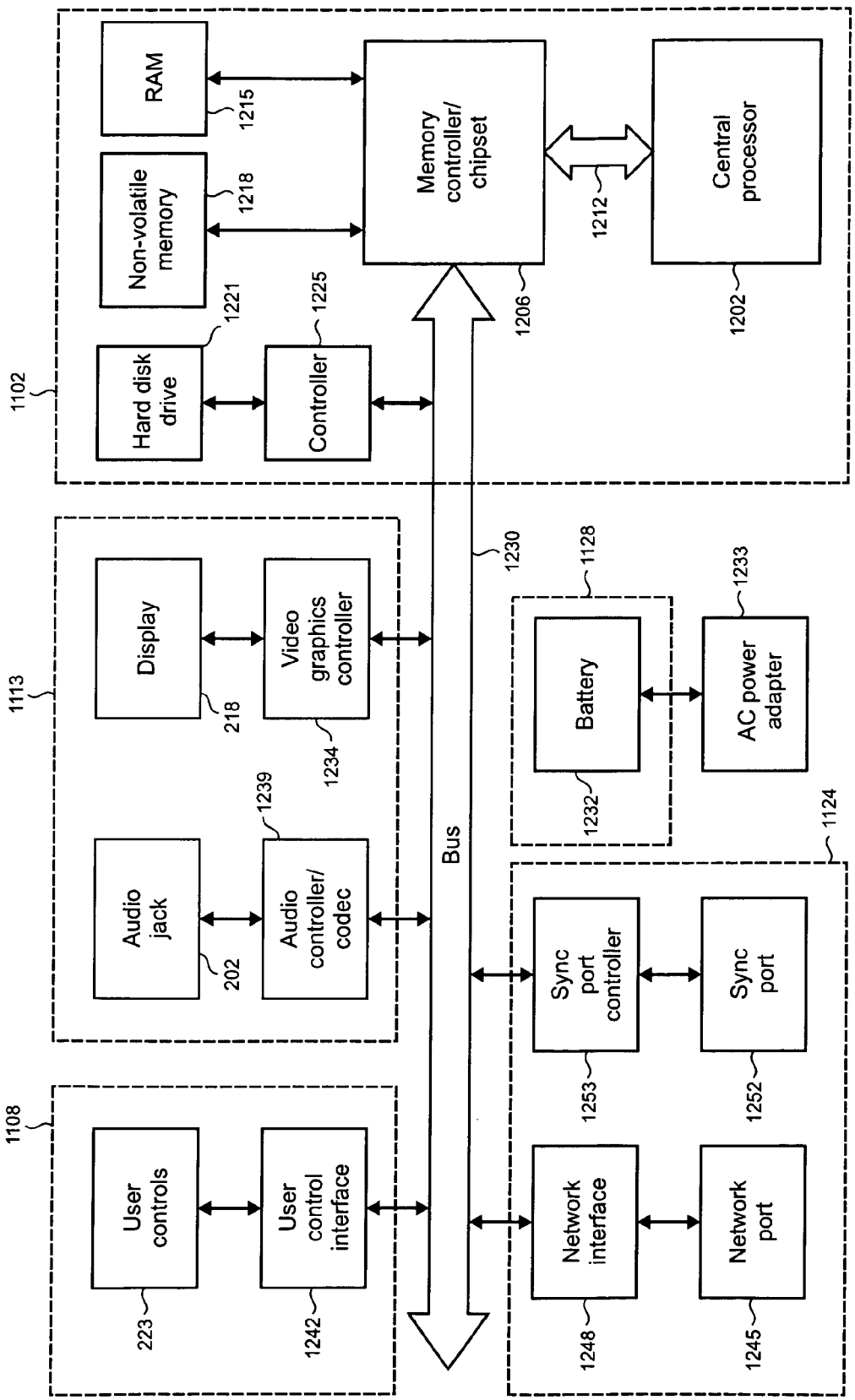
FIG. 12 is a simplified block diagram that shows various physical components of an illustrative example of a personal media player.

FIG. 12 is a simplified block diagram that shows various illustrative physical components of the personal media player 110 based on the functional components shown in FIG. 11 and described in the accompanying text (which are represented in FIG. 12 by dashed lines) including the digital media processing system 1102, the user interface system 1108, the display unit system 1113, the data port system 1124, and the power source system 1128. While each physical component is shown as included in only a single functional component in FIG. 12 the physical components may, in fact, be shared by more than one functional component.

The physical components include a central processor 1202 coupled to a memory controller/chipset 1206 through, for example, a multi-pin connection 1212. The memory controller/chipset 1206 may be, in turn, coupled to random access memory ("RAM") 1215 and/or non-volatile memory 1218 such as solid-state or Flash memory. These physical components, through connectivity with the memory controller/chipset 1206, may be collectively coupled to a hard disk drive 1221 (or other solid-state memory) via a controller 1225, as well as to the rest of the functional component systems via a system bus 1230.

In the power supply system 1128, a rechargeable battery 1232 may be used to provide power to the components using one or more connections (not shown). The battery 1232, in turn, may also be coupled to the external AC power adapter 1233 or receive power via the sync cable 335 when it is coupled to the PC 310₁ (FIG. 3).

The display screen 218 is associated with a video graphics controller 1234. The video graphics controller will typically use a mix of software, firmware, and/or hardware, as is known in the art, to implement the GUI on the display screen 218. Along with the audio jack 202 and its associated audio controller/codec 1239, these components comprise the display unit system 1113 and may be directly or indirectly connected to the other physical components via the system bus 1230.

The user controls 223 are associated with a user control interface 1242 in the user interface system 1008 that implements the user control functionality that is used to support the interaction with the GUI as described above. A network port 1245 and associated network interface 1248, along with the sync port 1252 and its associated controller 1253 may constitute the physical components of the data port system 1124. These components may also directly or indirectly connect to the other components via the system bus 1230.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An article of manufacture comprising a computer-readable storage memory containing instructions which, when executed by one or more processors disposed in a personal media player, perform a method for transferring information describing a wireless network from the personal media player to an accessory device, the method comprising:

capturing the information that is usable by an access point in the wireless network to enable discovery of the wireless network by one or more wireless networkable devices, and to enable secure access to the wireless network;

transferring the information to the accessory device upon a physical coupling between the personal media player and the accessory device, the transferred information being usable by the accessory device to join the wireless network; and receiving an accessory device ID at the personal media player that uniquely identifies the accessory device, the accessory device ID usable by the personal media player to identify and connect to the accessory device over the wireless network, the accessory device ID automatically transferred from the accessory device to the personal media player after the physical coupling; and using the accessory device ID to discover the accessory device on the wireless network after the personal media player is uncoupled from the accessory device.

2. The computer-readable storage memory of claim 1 in which the information comprises at least one of a wireless network ID, network key, or credentials.

3. The computer-readable storage memory of claim 2 in which the network key conforms to one of WEP, WPA, or WPA2.

4. The computer-readable storage medium memory of claim 1 in which the method includes sending data from the personal media player to the accessory device over the wireless network.

5. The computer-readable storage memory of claim 4 in which the sending comprises streaming audio content that is stored on the personal media player for remote rendering by the accessory device.

6. The computer-readable storage memory of claim 1 in which the accessory device is a speaker system including an integrated docking cradle to receive the personal media player in a removably couplable arrangement, the docking cradle and personal media player when coupled forming a signal path through which the information may be transferred.

7. The computer-readable storage memory of claim 1 in which the method includes prompting a user to agree to transfer the information from the personal media player to the accessory device.

8. The computer-readable storage memory of claim 1 in which the physical coupling comprises a docking process between the personal media player and the accessory device.

9. A speaker system with an integrated docking cradle for removably receiving a personal media player, comprising a device connector disposed in the docking cradle for mateably engaging with a docking connector in the personal media player, the connectors when mateably engaged creating a signal path there through, the connectors being mateably engaged when the personal media player is docked with the docking cradle;
  a device interface operatively coupled to the device connector for receiving data over the signal path from an accessory interface in the personal media player, the data including at least an ID for a wireless network and key used for securing the wireless network;
  a wireless transceiver module operative to automatically receive the data after the personal media player is docked, and to communicate with an access point on the wireless network using the data;
  speaker system functionality comprising an audio transducer and at least one of digital signal processing or amplification; and
  an accessory interface operative to transfer an accessory device ID to the docked personal media player, the accessory device ID being usable by the personal media player to discover, identify and connect to the speaker system over the wireless network when undocked from the speaker system, the accessory device ID automatically transferred from the speaker system to the docked personal media player after the personal media player is docked.

10. The speaker system of claim 9 in which the wireless transceiver is further operative to receive audio content from the personal media player for rendering through the speaker system functionality.

11. The speaker system of claim 9 as configured to render a stereophonic signal.

12. A computer-readable storage memory containing instructions which, when executed by one or more processors disposed in an electronic device, implement a wireless network setup utility that is arranged for performing a method comprising:
  configuring an access point usable with a wireless network, the configuring including selection by a user of an ID for the wireless network and a key used for securing the wireless network; and
  transferring the ID and key to a personal media player during a data synchronization process between the electronic device and the personal media player, the transferred ID and key being utilized by the personal media player for sharing the ID and key with an accessory device upon a physical coupling between the personal media player and the accessory device for enabling the accessory device to discover and securely join the wireless network, the personal media player automatically receiving an accessory device ID upon the physical coupling usable by the personal media player to discover, identify and connect to the accessory device over the wireless network after the personal media player is uncoupled from the accessory device.

13. The computer-readable memory of claim 12 in which the method is performed by a web-browser application that runs on the electronic device.

14. The method of claim 12 in which the electronic device is a PC and the data synchronization process is performed using one of wired or wireless connection between the PC and the personal media player.

15. The method of claim 14 in which the data synchronization process is arranged to transfer media content from the PC to the personal media player, at least a portion of the media content being downloaded to the PC from a remote media content service over the Internet.

16. The method of claim 12 in which the accessory device comprises a speaker system with an integrated docking cradle that is arranged to removably receive the personal media player.

17. The method of claim 12 in which the wireless network conforms to IEEE 802.11.

18. The method of claim 12 in which the access point includes gateway functionality.

* * * * *